United States Patent [19]

Ikeda et al.

[11] Patent Number: 5,429,012
[45] Date of Patent: Jul. 4, 1995

[54] BICYCLE SPEED CHANGE OPERATION ASSEMBLY

[75] Inventors: Kenji Ikeda; Yoshihisa Iwasaki, both of Osaka, Japan

[73] Assignee: Maeda Industries, Ltd, Osaka, Japan

[21] Appl. No.: 146,113

[22] PCT Filed: Mar. 22, 1993

[86] PCT No.: PCT/JP93/00334

§ 371 Date: Nov. 10, 1993

§ 102(e) Date: Nov. 10, 1993

[87] PCT Pub. No.: WO93/18959

PCT Pub. Date: Sep. 30, 1993

[30] Foreign Application Priority Data

Mar. 23, 1992 [JP] Japan .................. 4-064824
Jun. 17, 1992 [JP] Japan .................. 4-158303

[51] Int. Cl.⁶ ........................... B60K 20/06
[52] U.S. Cl. ........................ 74/475; 74/489; 74/502.2; 74/577 SF
[58] Field of Search ............ 74/475, 489, 502.2, 74/577 SF

[56] References Cited

U.S. PATENT DOCUMENTS 3,943,794 3/1976 Shimada .................. 74/502.2

FOREIGN PATENT DOCUMENTS 62-38878 10/1987 Japan .................. B62M 25/04
246467 12/1990 Japan .................. B62K 23/04
906492 9/1962 United Kingdom .......... 74/489

Primary Examiner—Charles A. Marmor
Assistant Examiner—David M. Fenstermacher
Attorney, Agent, or Firm—Michael D. Bednarek; Marks & Murase

[57] ABSTRACT

A speed change operation assembly is provided which requires only a small mounting space and is unlikely to interfere with a brake lever assembly and the like even if mounted near a grip portion of a handlebar. The speed change operation assembly (1) comprises an annular lever mount (5) fixedly fitted on a handlebar (2), and a generally C-shaped lever member (6) elastically fitted on the lever mount for pivotal operation about an axis of the handlebar. The lever mount is integrally formed, on its outer circumference, with a sheath stopper portion (11) for attachment to an end of an outer sheath (w2) of a speed control cable (W) which additionally includes an inner wire (w1) inserted in the outer sheath. On the other hand, the lever member is integrally formed, on its outer circumference, with a wire stopper portion (14) for attachment to an end of the inner wire extending beyond the end of the outer sheath as well as with operating arm portions (15a, 5b) for engagement with the fingers of a rider.

9 Claims, 7 Drawing Sheets

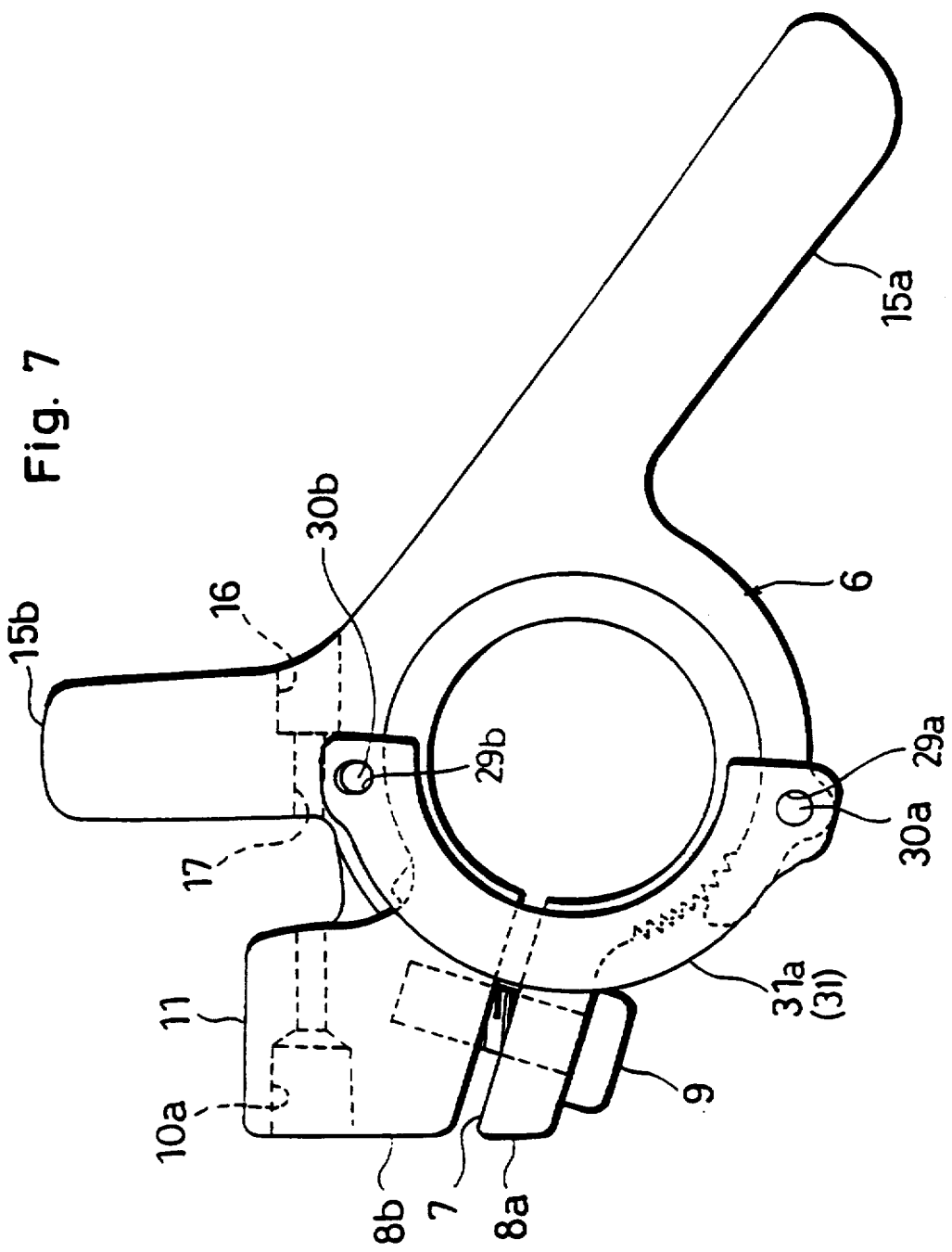

BICYCLE SPEED CHANGE OPERATION ASSEMBLY

FIELD OF THE INVENTION

The present invention relates to a bicycle speed change operation assembly.

BACKGROUND ART

A speed change system for a bicycle comprises a derailleur, and a speed change lever assembly connected to the derailleur through a control cable and mounted to a suitable portion of a frame or handlebar. A speed change operation is performed by operating the speed change lever assembly to actuate the derailleur.

In general, a speed change lever assembly comprises a fixed shaft provided on a frame or handlebar, and an operation lever pivotally supported on the shaft with its base portion connected to a control cable. When the operation lever is pivotally operated in one direction, the control cable is wound in a winding groove of the lever base-portion. On the other hand, when the operation lever is pivotally operated in the opposite direction, the control cable is paid out from the winding groove of the lever under the urging force of a return spring which is incorporated in the derailleur.

A speed change lever assembly such as described above is usually disposed at a position which is remote from a handlebar grip portion, so that the rider must remove one hand from the handlebar to assume a one-hand riding condition at the time of performing a speed change operation. Therefore, in a situation for making an emergency stop or avoiding an abrupt projection or recess of a road while performing a speed change operation, it takes a longer time to move the hand to the braking or steering position, consequently failing to provide a high running safety in such a situation.

To solve the above problem, it has been proposed to mount a speed change lever assembly adjacent to a grip portion of a handlebar for enabling the rider to operate the lever assembly while gripping the handlebar, as disclosed in Japanese Utility Model Publication 62-388785 for example. According to such an arrangement, it is not necessary to remove the hand completely from the grip portion at the time of operating the lever, thus increasing the safety.

As disclosed in the above-mentioned publication, the prior art speed change lever assembly, which is mounted adjacent to the grip portion of the handlebar, comprises a lever shaft fixed to the handlebar by a mounting band or the like, and a speed change lever pivotally mounted on the lever shaft.

However, since a brake lever must be provided inwardly of each grip portion of the handlebar, it is very difficult to make a space for mounting the speed change lever assembly. Further, the speed change lever assembly may interfere with the brake lever assembly, hence making it very inconvenient to operate the speed change lever assembly.

On the other hand, there has been an increasing need in recent years for providing a derailleur even with respect to children bicycles, mini-bicycles and the like. However, the prior art speed change lever assembly described above is designed for application to derailleurs having five or more speed stages. Thus, the prior art speed change lever assembly is complicated in structure to result in an increase of the production cost.

Due to the above problem, it is difficult to apply the prior art speed change lever assembly to bicycles such as children bicycles, mini-bicycles and the like, which have a small number of speed stages.

DISCLOSURE OF THE INVENTION

It is therefore an object of the present invention to provide a bicycle speed change operation assembly which requires only a small mounting space and is unlikely to interfere with a brake lever assembly and the like even if mounted near a grip portion of a handlebar.

Another object of the present invention is to provide a bicycle speed change operation assembly which enables a great reduction in the production cost and is applicable to a bicycle having a small number of speed stages.

The present invention provides a speed change operation assembly which comprises an annular lever mount fixedly fitted on a handlebar, and a generally C-shaped lever member elastically fitted on the lever mount for pivotal operation about an axis of the handlebar, wherein the lever mount is integrally formed, on its outer circumference, with a sheath stopper portion for attachment to an end of an outer sheath of a speed control cable which additionally includes an inner wire inserted in the outer sheath, and wherein the lever member is integrally formed, on its outer circumference, with a wire stopper portion for attachment to an end of the inner wire extending beyond said end of the outer sheath as well as with operating arm means for engagement with the fingers of a rider.

Other objects, features and advantages of the present invention will be made clearer by the description of preferred embodiments given with reference to the accompanying drawings.

BRIEF DESCRIPTION OF THE DRAWINGS

FIG. 7 is a side view showing a third embodiment of the present invention.

BEST MODE FOR CARRYING OUT THE INVENTION

Bicycle speed change assemblies according to the present invention are specifically described below with reference to the accompanying drawings.

A speed change operation assembly 1 according to an embodiment is arranged between a grip 3 at an end of a handlebar 2 and a brake lever assembly 4 provided inwardly from the grip 3 widthwise of the bicycle.

Figure 2:
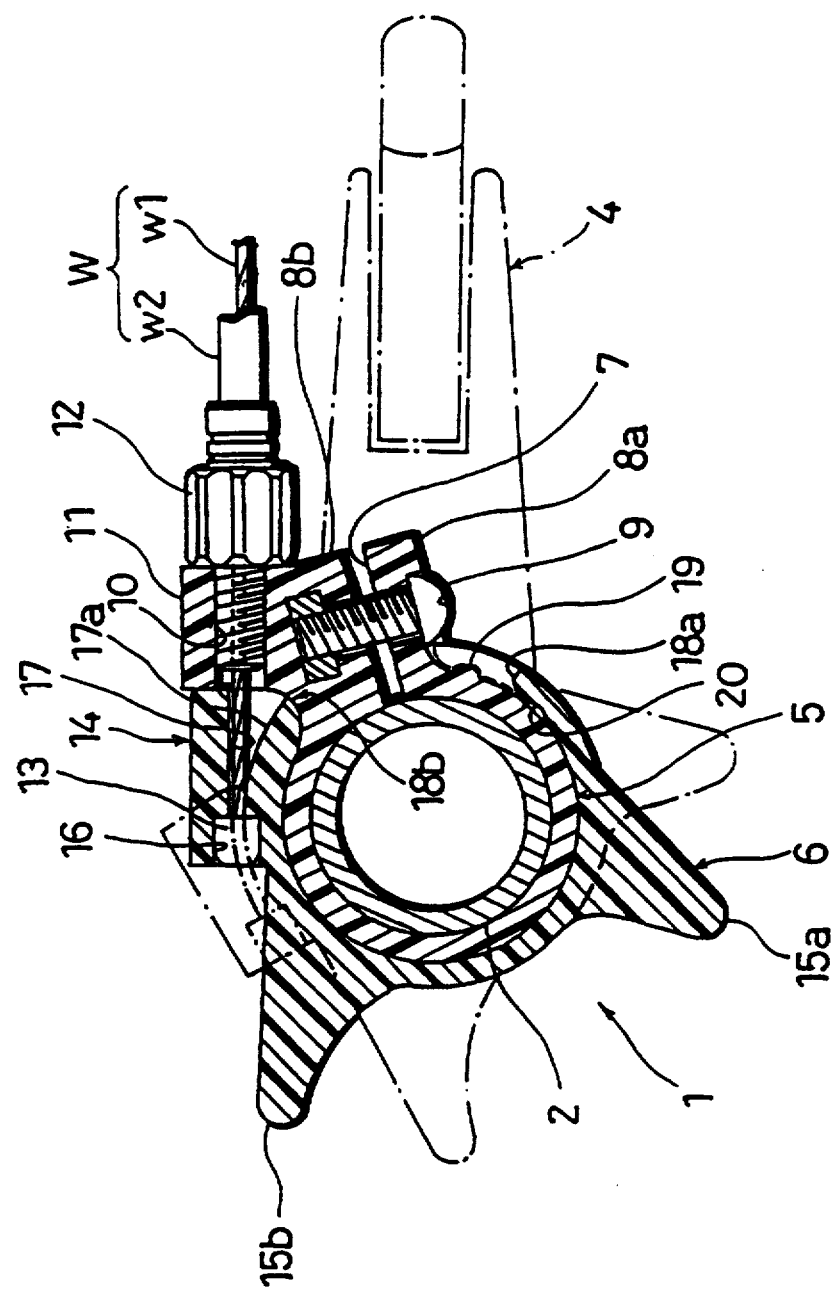
FIG. 2 is a sectional view taken on lines II—II in FIG. 1.

As shown in FIG. 2, the speed change operation assembly 1 mainly comprises an annular lever mount 5 fixedly fitted on the handlebar 2, and a lever member 6 elastically fitted on the lever mount 5.

The lever mount 5, which is integrally formed of resin, has an axial slit 7 formed through its circumferential wall to extend axially, and an opposed pair of tightening portions 8a, 8b extending radially on both sides of the slit 7. The lever mount 5 is fixed on the handlebar 2 by forcibly reducing the inner diameter of the lever mount 5 by means of a mounting screw 9 traversing the slit 7 after fitting the lever mount 5 onto the handlebar 2.

One tightening portion 8b of the lever mount 5 is provided with a sheath stopper portion 11 which is in turn formed with a threaded hole 10 extending perpendicularly to the axis of the handlebar 2. A speed control cable W, which includes an inner wire w1 and an outer sheath w2, has its outer sheath w2 provided, at an end thereof, with a sheath catcher bolt 12 engaging into the threaded hole 10. The inner wire w1 extends beyond the threaded hole 10 toward the circumference of the lever mount 5.

As shown in FIG. 2, the lever member 6, which is integrally formed of resin, is generally C-shaped with a cutout corresponding to the tightening portions 8a, 8b. The lever member is elastically fitted on the outer circumference of the lever mount 5.

The lever member 6 is provided, on its outer circumference, with a wire stopper portion 14 for engagement with an end of the inner wire w1 extending out of the threaded hole 10 of the sheath stopper portion 11. The lever member is also provided with operating arm portions 15a, 15b for engagement with the fingers of the rider.

The wire stopper portion 12 is formed, at a side thereof circumferentially opposite the sheath stopper portion 11, with a nipple engaging hole 16, and a wire insertion hole 17 extending from the bottom of the nipple engaging hole 16 toward the sheath stopper portion. The wire insertion hole 17 has a radially inner surface portion 17a which is formed in an arc centered about a pivotal axis for pulling the inner wire w1 while winding it.

The inner wire w1 is inserted through the wire insertion hole 17 and has an integral end nipple 13 engaging in the nipple engaging hole 16. In this way, the inner wire w1 is fixed to the wire stopper portion.

According to this embodiment, the operating arm portions 15a, 15b are formed to project at two positions which are circumferentially spaced by a predetermined amount. Such an arrangement enables the rider's fingers to engage either of the operating arm portions 15a, 15b, depending on the position of the fingers grasping the grip 3, for pivotally operating the lever member 6.

With the speed change operation assembly 1 having the above-described configuration, when the lever member 6 is pivotally operated counterclockwise, the inner wire w1 is pulled relative to the outer sheath w2, as indicated by phantom lines in FIG. 2. On the other hand, when the lever member 6 is pivotally operated clockwise, the inner wire w1 is paid out relative to the outer sheath w2. Such operations results in relative axial movement between the inner wire w1 and the outer sheath w2, thereby actuating an unillustrated derailleur.

The C-shaped lever member 6 of the speed change operation assembly 1 according to the present embodiment has mouth ends 18a, 18b and is pivotally operable within a range limited by abutment of the mouth ends with the root of the tightening portions 8a, 8b or sheath stopper portion 11. Further, for holding the lever member 6 at a wire pulling position, the outer circumference of the lever mount 5 is provided with projections 19, whereas the inner circumference of the lever member 6 is provided with an engaging recess 20 for selective engagement with the projections 9. Therefore, the lever member 6 pulling the control cable W is held at a pivotal position when one of the projections 19 engages the engaging recess 20. It should be appreciated that the present embodiment is designed for a two-stage speed change device incorporating two sprockets, so that the lever member 6 is stopped at a pivotal position wherein one mouth end 18b abuts the root of one tightening portion 8b and another pivotal position wherein the other mouth end 18a abuts the root of the other tightening portion 8a.

Figure 1:
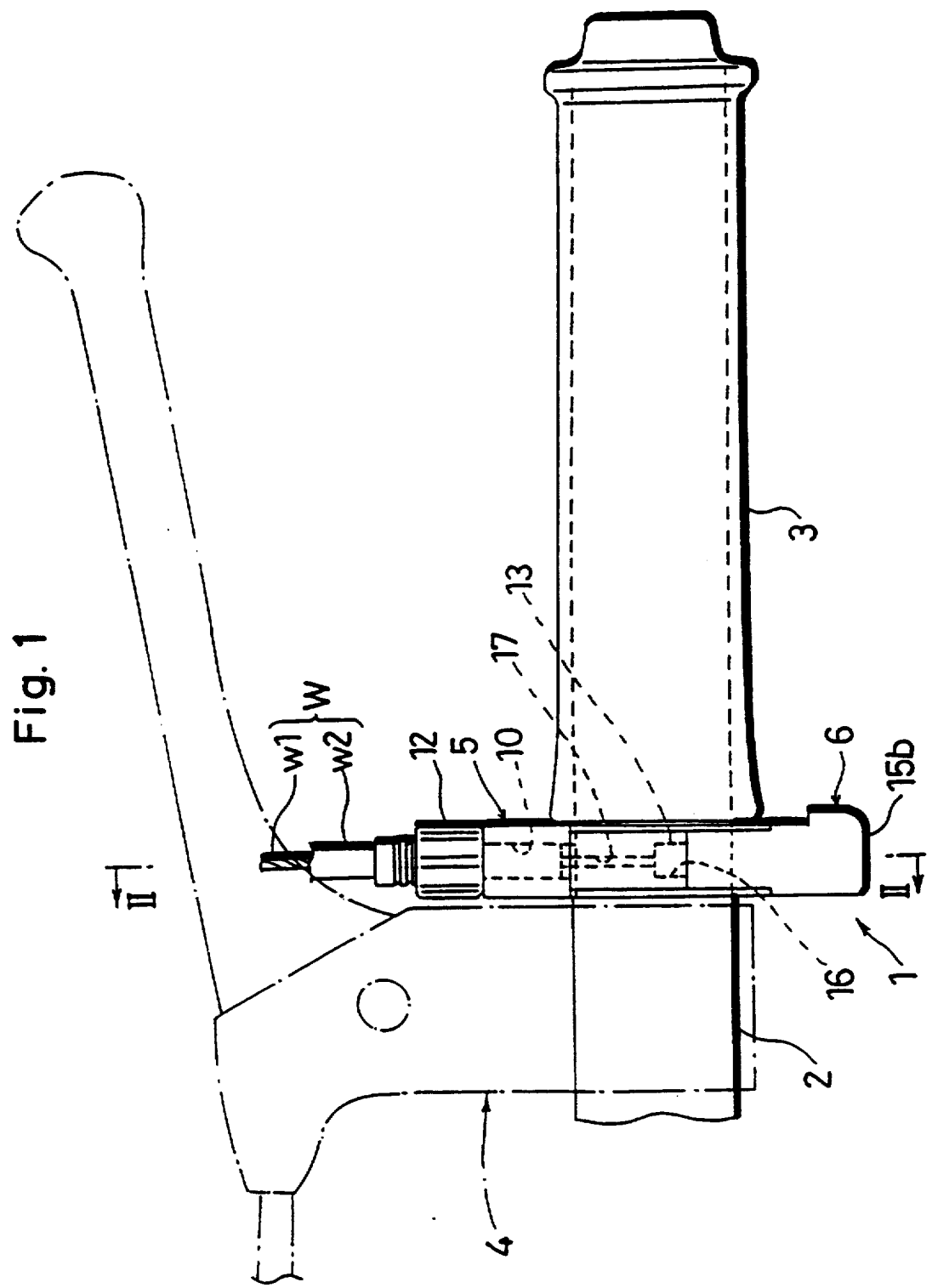
FIG. 1 is a plan view showing a speed change operation assembly according to a first embodiment of the present invention.

According to the present invention, the speed change operation assembly 1 is constituted by pivotally mounting the generally C-shaped lever member 6 on the outer circumference of the annular lever mount 5, as shown in FIGS. 1 and 2. Therefore, as apparent from FIG. 1, the width of the speed change operation assembly 1 is rendered extremely small axially of the handlebar 2, thus making it unnecessary to use a large mounting space. Further, the speed change operation assembly 1 rarely interferes with the brake lever assembly 4 or the like at the time of mounting the speed change operation assembly 1 and operating the lever member.

Moreover, the speed change operation assembly 1 according to the present embodiment is constituted mainly by the annular lever mount 5 fitted around the handlebar 2 and the generally C-shaped lever member 6 fitted on the outer circumference of the lever mount 5, so that the number of the constituent parts is extremely small. As a result, the manufacturing cost can be greatly reduced, and the speed change operation assembly 1 can be mounted to the handlebar very easily.

Therefore, the present embodiment can be readily applicable to bicycles, such as children bicycles, minibicycles and the like, which incorporate a derailleur designed to provide a small number of speed stages.

Figure 3:
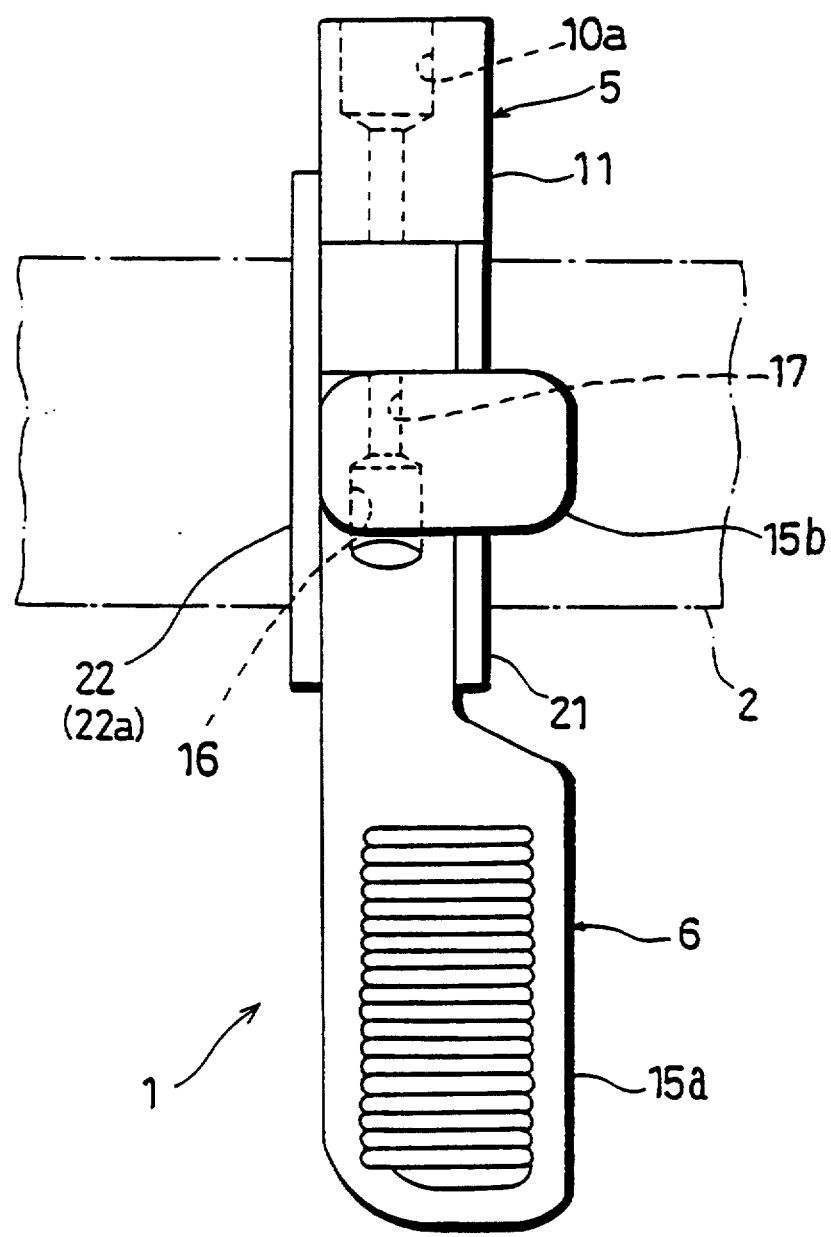
FIG. 3 is a plan view showing a speed change operation assembly according to a second embodiment of the present invention.
Figure 4:
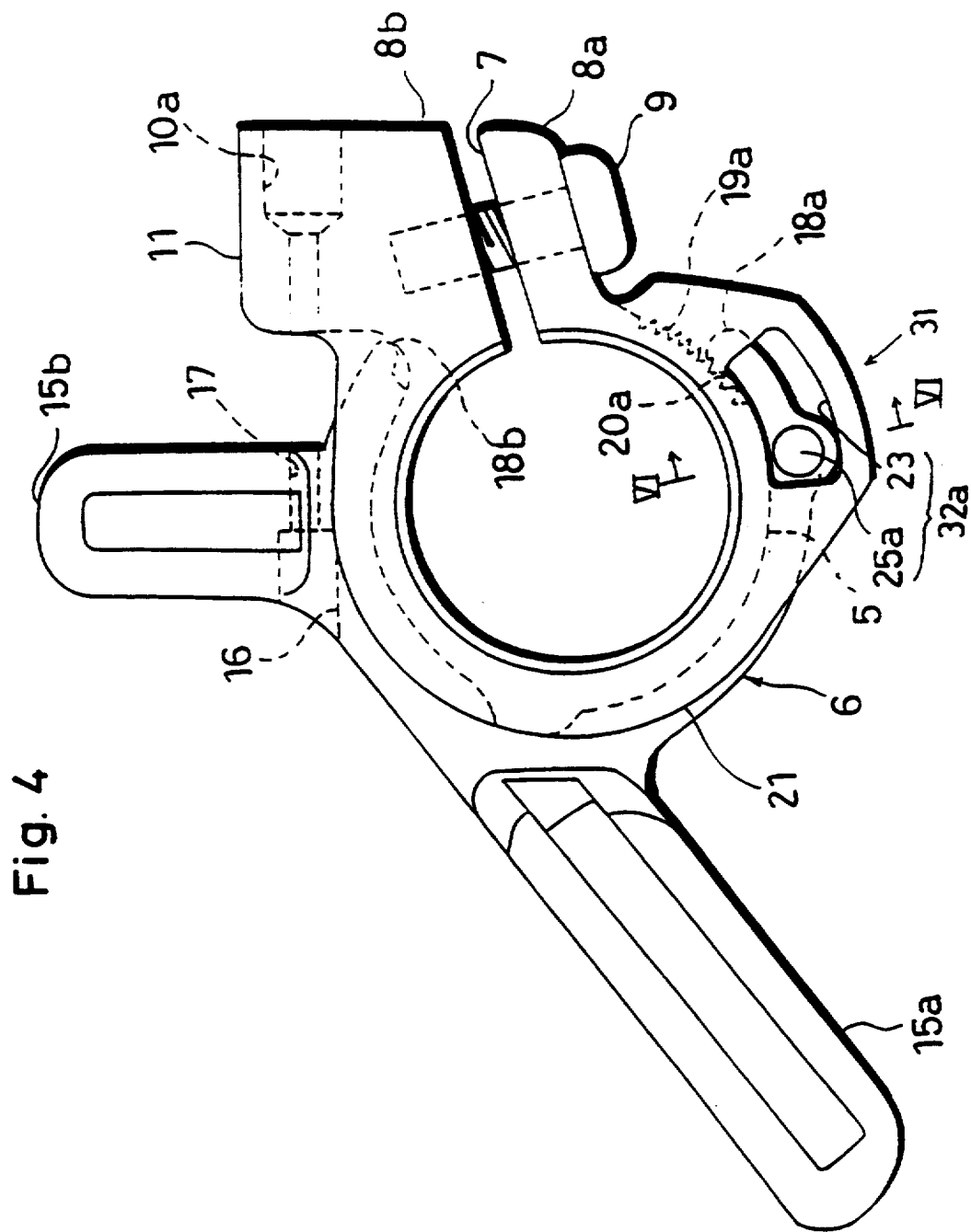
FIG. 4 is a right side view of the second embodiment shown in FIG. 3.
Figure 5:
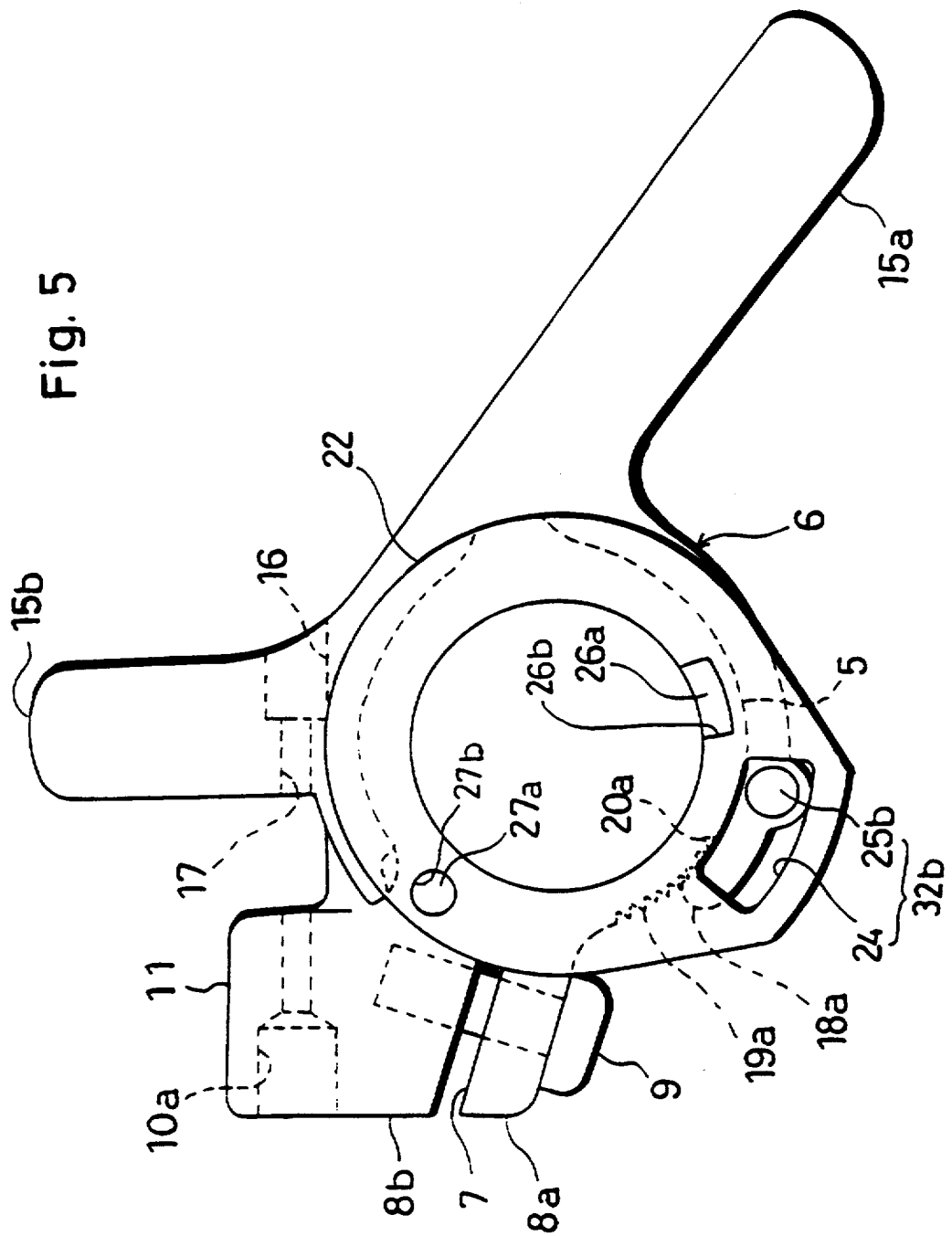
FIG. 5 is a left side view of the second embodiment shown in FIG. 3.
Figure 6:
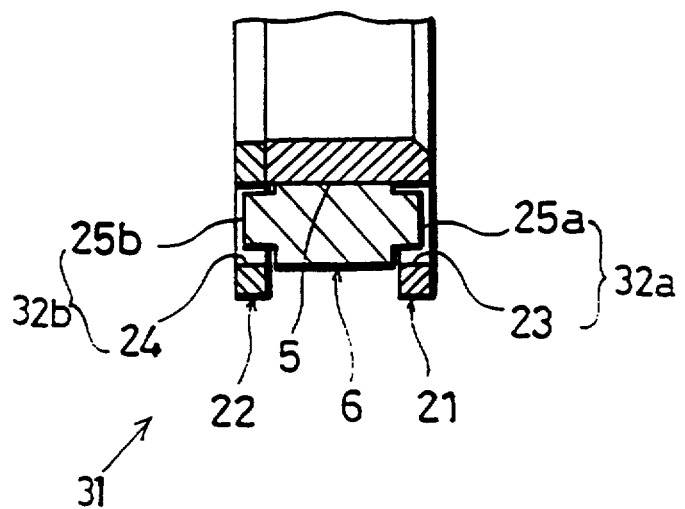
FIG. 6 is a sectional view taken on lines VI—VI in FIG. 4.

FIG. 3 is a plan view of a speed change operation assembly according to a second embodiment of the present invention. FIG. 4 is a right side view of the speed change operation assembly shown in FIG. 3, whereas FIG. 5 is a left side view of the speed change operation assembly shown in FIG. 3. FIG. 6 is a sectional view taken along lines VI—VI in FIG. 2.

According to the embodiment shown in these figures, there is provided a deformation preventing means 31 for preventing opening deformation of the mouth ends of the C-shaped lever member 6.

As shown in FIGS. 3 to 6, the deformation preventing means 31 comprises an outer flange 21 and inner flange 22 formed on both sides of the lever mount 5 to flank the lever member, and engaging means 32a, 32b for establishing engagement of the flanges 21, 22 with the respective sides of the lever member.

As shown in FIG. 3, the outer flange 21 is formed integrally with the lever mount 5 on the outer side thereof axially of the handlebar 2. On the other hand, the inner flange 22 is formed by attaching a doughnut-shaped flange member 22a to the lever mount 5 on the inner side thereof axially of the handlebar 2.

For attaching the flange member 22a, one side of the lever mount 5 is provided with projections 26a, 27a, as illustrated in FIG. 5. The flange member 22a is formed with connection holes 26b, 27b for receiving the projections 26a, 27a the tips of which are later riveted for fixing the flange member 22a to the lever mount 5.

As shown in FIGS. 2 to 6, the engaging means 32a, 32b comprise integral engaging projections 25a, 25b formed on the respective sides of the lever member 6 closer to the wire pulling side mouth end. The respective flanges 21, 22 are formed with engaging slots 23, 22 for engagement with the engaging projections 25a, 25b, respectively.

Each of the engaging slots 23, 22 has a radial width enough for receiving the corresponding engaging projection 25a, 25b and is elongated circumferentially. The circumferential length of the engaging slot 23, 24 is selected to correspond to the pivotal amount of the lever member 6.

With the engaging projections 25a, 25b engaging in the respective engaging slots 23, 22, the engaging projections 25a, 25b are prevented from displacing radially outward. Specifically, when the mouth end 18a tends to displace radially outward together with the engaging projections 25a, 25b, such displacement is prevented by engagement of the engaging projections 25a, 25b with the radially outer arcuate edges of the respective engaging slots 23, 22. Therefore, the speed change operation will not be adversely affected by unexpected large expansion of the C-shaped lever member 6.

On the other hand, the engaging slots 23, 24 are arcuately elongated in corresponding relation to the pivotal moving range of the engaging projections 25a, 25b, so that the engaging projections 25a, 25b are allowed to move circumferentially. Therefore, the pivotal movement of the lever member 6 will not be hindered.

The provision of the deformation preventing means 31 greatly increases resistance to deformation of the lever member 6, thereby preventing the pivotal axis of the lever member from displacing greatly from the axis of the handlebar due to a large radial deformation of the mouth ends 18a, 18b. As result, the speed change operation will not be adversely affected, and the lever member 6 is prevented from coming off the lever mount 5.

FIG. 7 illustrates a third embodiment of the present invention.

In this embodiment, a deformation preventing means 11 comprises a connecting member 31a arranged on one side of the C-shaped lever member 6 for connecting between the mouth ends of the lever member.

The connecting member 31, which is in the form of a doughnut half, is provided, at both ends, with respective connecting holes 29a, 29b. These connecting holes are brought into engagement with connecting projections 30a, 30b formed on one side of the lever member 6.

The connecting member 31a together with the C-shaped lever member 6 virtually provides a annular structure to greatly increase the rigidity of the lever member 6. As a result, the mouth ends 18a, 18b are prevented from moving away from each other by radial displacement, so that the speed change operation will not be adversely affected.

The scope of the present invention is not limited to the above-described embodiments.

The speed change operation assembly, which is arranged between the grip 3 of the handlebar 2 and the brake lever assembly 4 according to the embodiments, may be arranged axially inwardly from the brake lever assembly 4.

The lever member 6, which is formed of resin and made to fit on the outer circumference of the lever mount 5 under its own elasticity alone, may be elastically reinforced by attaching a C-shaped spring or the like onto a side surface.

The speed change operation assembly, which is designed for a two-stage derailleur according to the embodiments, may be modified for application to a derailleur having three or more stages.

Further, in the first embodiment, a combination of the projections 19 and the engaging recess 20 is provided for holding, at a pivotal position, the lever member 6 pulling the control cable. However, use may be made of only the friction between the lever mount 5 and the lever member 6, or of engagement between engaging teeth 19a, 20a formed respectively on the lever mount 5 and the lever member 6 as in the second embodiment, thereby holding the lever member 6 at predetermined pivotal positions.

Further, as shown in FIG. 5, the radial width of the engaging slots 23, 22 may be slightly larger than the diameter of the engaging projections 25a, 25b. In this way, the lever member is allowed to deform slightly, thereby ensuring smooth engagement and disengagement between the engaging teeth 19a, 20a.

According to the second embodiment, the engaging means 32a, 32b are provided on both sides of the lever member 6. However, such means may be provided only on one side.

Moreover, the arrangement of the engaging means 32a, 32b is not limited to the one shown for the embodiment. For instance, the engaging slots 23, 22 may be replaced by projecting arcs which prevent radially outward displacement of the engaging projections 25a, 25b. Further, the engaging projections may be provided on the flanges, whereas the engaging slots are formed in the lever member. The deformation preventing means need not be configured as shown for the embodiment but may take other forms.

I claim:

1. A bicycle speed change operation assembly comprising:

an annular lever mount fixedly fitted on a handlebar adjacent to a grip thereof; and a generally C-shaped lever member elastically fitted on the lever mount separately from the grip for pivotal operation about an axis of the handlebar;

wherein the lever mount has an outer circumference integrally formed with a sheath stopper portion for attachment to an end of an outer sheath of a speed control cable which additionally includes an inner wire inserted in the outer sheath; and wherein the outer circumference of the lever member is also integrally formed with a wire stopper portion for attachment to an end of the inner wire extending beyond said end of the outer sheath as well as with operating arm means which projects outwardly away from the lever mount for engagement with at least one finger of a rider.

2. The speed change operation assembly according to claim 1, wherein the C-shaped lever member is provided with deformation preventing means for preventing mouth ends of the lever member from expansively deforming.

3. The speed change operation assembly according to claim 2, wherein the deformation preventing means comprises a flange formed on a side of the lever mount to flank the lever member, and engaging means provided between the flange and the lever member for preventing radial displacement of the lever member while allowing circumferential movement of the lever member.

4. The speed change operation assembly according to claim 2, wherein the deformation preventing means comprises a connecting member for connecting between the mouth ends of the C-shaped lever member.

5. The speed change operation assembly according to claim 1, further comprising engaging means provided between the lever mount and the lever member for holding the lever member at predetermined pivotal positions.

6. The speed change operation assembly according to claim 5, wherein the engaging means comprises engaging projections and an engaging recess formed respectively on the lever mount and the lever member, the engaging projections coming into engagement with the engaging recess at the predetermined pivotal positions.

7. The speed change operation assembly according to claim 5, wherein the engaging means comprises engaging teeth formed respectively on the lever mount and the lever member.

8. The speed change operation assembly according to claim 1, wherein the operating arm means comprises two operating arm portions which are spaced circumferentially of the lever mount.

9. The speed change operation assembly according to claim 8, wherein one of the operating arm portions is longer than the other of the operating arm portions.

* * * * *